United States Patent [19]

Yoder, Jr. et al.

[11] 4,170,401
[45] Oct. 9, 1979

[54] PASSIVE ERROR COMPENSATING DEVICE FOR OPTICAL ALIGNMENT

[75] Inventors: Paul R. Yoder, Jr.; Eugene R. Schlesinger, both of Wilton; Robert Crane, Jr., Westport, all of Conn.

[73] Assignee: The Perkin-Elmer Corporation, Norwalk, Conn.

[21] Appl. No.: 824,529

[22] Filed: Aug. 15, 1977

[51] Int. Cl.$^2$ .................... G02B 27/14; G01C 1/00
[52] U.S. Cl. .................... 350/173; 350/174; 356/138
[58] Field of Search ........... 356/138, 153, 150-151; 350/172-174, 152

[56] References Cited

U.S. PATENT DOCUMENTS

| 1,687,030 | 10/1928 | Mitchell | 250/203 R |
| 3,389,632 | 6/1968 | Plummer | 356/153 |
| 3,528,748 | 9/1970 | Burch et al. | 356/153 |

FOREIGN PATENT DOCUMENTS 1178973  1/1970  United Kingdom .................... 350/173

OTHER PUBLICATIONS

NPL, "Laser Alignment Device," National Physical Lab., Teddington, Middlesex, England, Brochure, 1969.
Jacobs, D. H., "Fundamentals of Optical Engineering," McGraw-Hill, 1943, pp. 152-165.

*Primary Examiner*—John K. Corbin
*Assistant Examiner*—Wm. H. Punter
*Attorney, Agent, or Firm*—Salvatore A. Giarratana; Francis L. Masselle; Edwin T. Grimes

[57] ABSTRACT

A passive compensating device which compensates for angular and translational misalignment errors in a polarized beam and assures the projected beam centroid remains at the same position. The device splits the incoming beam into two beams. Thereafter, optical orienting means disposed to intercept the two beams is operative to rotate the wavefront of both beams so that the composite beam exiting a combiner has two components wherein one component has its wavefront rotated 180° about two orthogonal axes with respect to the other beam. Accordingly, the composite beam centroid is maintained at one position regardless of jitter of the beam entering the compensator device.

15 Claims, 5 Drawing Figures

PASSIVE ERROR COMPENSATING DEVICE FOR OPTICAL ALIGNMENT

BACKGROUND OF THE INVENTION

This invention relates generally to the field of alignment and particularly to the field of highly accurate alignment of two bodies relative to each other.

Aligning two bodies relative to each other has been a problem in many fields for years. Numerous mechanical approaches too voluminous to describe here have been developed to permit accurate alignment of two or more bodies. Such mechanical approaches have proved successful to a greater or lesser extent but suffer from only being able to achieve accuracy to the extent typically achievable by mechanical approaches. For extremely precise applications, however, such mechanical approaches do not provide sufficient accuracy.

To improve alignment accuracy, optical systems have been developed such as the "Visual Alignment Aid" described in NASA TECH BRIEF NO. 75-10228. This device consists of a beam splitting-combining cube with orthogonally oriented roof prisms cemented to two adjacent faces of the beam splitting-combining cube. Each roof prism independently inverts one of the reflected/transmitted beams produced within the cube during a first optical pass therethrough. The beams are recombined in the cube and exit a face different from the entrance face to the cube.

The NASA developed device is useful for alignment of telescopes and the like. Such alignment can be determined by the fact that the light rays exiting the device are parallel to each other only if the entering rays enter perpendicular to the entrance face. Accordingly, two images can be viewed if the entering rays do not enter perpendicular to the entrance face.

While the foregoing approach is useful in aligning telescopes and in other applications, it is not as suitable for use where the light source is a polarized light source such as a gas laser. This is due to the fact that the beams, when split, are not, in general, split into beams having substantially the same intensity. Consequently, when the beams are recombined, the composite beam is not simply a sum of the two split beams but a more complex function of them. As such, the NASA device is not readily useable for alignment when polarized light is being transmitted.

A further difficulty associated with the alignment device described above is that it utilizes roof prisms. In order to achieve the results as described in the NASA TECH BRIEF, the 90° dihedral angles of these prisms must be made with great precision otherwise the beams exiting the device will not have the proper alignment required to achieve its objective with a high degree of accuracy. While achieving the degree of precision necessary to make the device accurately operative is well within the skill of the art, nevertheless, manufacturing such prisms with the required precision is costly thereby significantly adding to the overall manufacturing cost of the device.

In view of the foregoing difficulties with the closest known prior art, it is the principal objective of the invention to provide a passive compensator for use in optical alignment which compensates for both angular and translational misalignment of a polarized beam.

It is still a further objective of the invention to provide an alignment system which includes a compensator for passively compensating for angular and translational misalignment in the system produced by a polarized light source, such as a laser, utilized in the system itself.

It is yet a further objective of the invention, in its most preferred form, to provide a passive compensator for compensating for angular and translational misalignment of a polarized beam where the compensator utilizes optical elements that do not have to be manufactured to high precision tolerances thereby reducing the overall cost of the system as compared to comparable ones utilizing high precision tolerance optical elements.

BRIEF DESCRIPTION OF THE INVENTION

The present invention relies on the premise of compensating for angular and translational misalignment occuring in a polarized light beam by first splitting the beam into two substantially equal intensity beams and then rotating the wavefront of one beam with respect to the other beam about two orthogonal axes. The beams are then combined so that angular and/or translational shift caused by the light source produces an equal and opposite shift in the two components of the composite beam thereby causing the beam centroid to remain at a fixed position.

The compensator according to the present invention has a polarizing beam splitter which intercepts the polarized beam from the system source and divides it into two separate beams each having substantially the same intensity. The two beams are then independently acted on by an optical orienter which rotates the wavefront of one beam with respect to the other beam about two orthogonal axes. The two beams are then combined in a polarizing beam combiner to form a composite beam and the net rotation by the compensator of the wavefront of one component beam with respect to the other component beam is 180° about each of the two orthogonal axes. Accordingly, any rotational or translational shift occuring in the polarized light source produces equal and opposite shifts in each of the components of the composite beam so that the beam centroid remains fixed.

BRIEF DESCRIPTION OF THE DRAWINGS

The foregoing and other objects, advantages and features of the present invention are described below in greater detail taken in connection with the drawings wherein.

DETAILED DESCRIPTION

Figure 1:
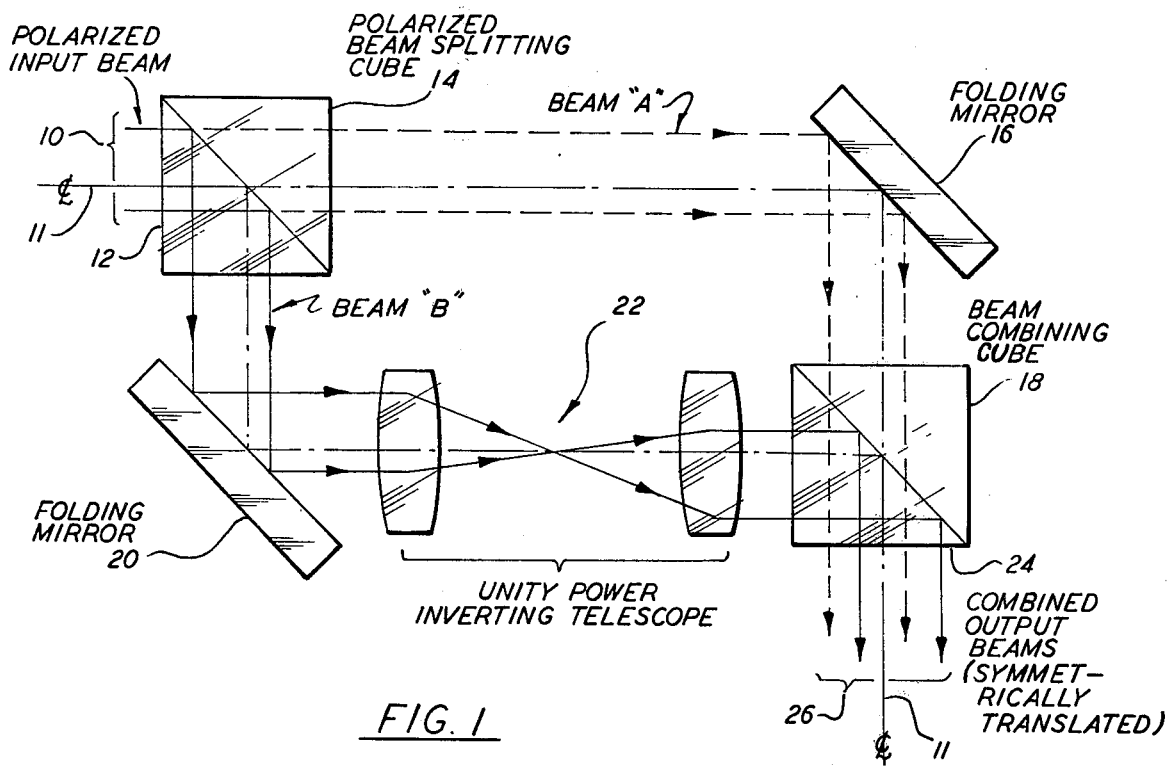
FIG. 1 comprises one embodiment of a passive compensator according to the present invention.

Referring first to FIG. 1, a polarized input beam 10 is produced by an external source (not shown). This beam may be produced by a gas laser (HeNe laser) or the like. The polarized input beam 10 is normally subject to very small translational and angular misalignment caused by the laser itself. The translational misalignment causes the centroid of the input beam 10 to shift in a direction parallel to the center line 11. Angular misalignment introduced by the laser itself causes the input beam to travel in a direction skewed to the center line 11. While both the translational and the angular misalignment caused by the laser itself is quite small, in very precise alignment systems, however, this misalignment contributes to the overall measured misalignment and can become significant. The compensator according to the present invention passively overcomes the errors introduced by the laser itself.

The polarized input beam 10 enters face 12 of a polarizing beam splitter 14 where the input beam is divided into two beams (beam A and beam B). By orienting the plane of polarization of the incoming beam 10 at 45° to the plane of reflection at the beam splitting surface of the polarizing beam splitter 14, the magnitude of beams A and B are made substantially equal. As will become evident from the following discussion, the polarized incoming beam 10 need not always be oriented at 45° to this plane of reflection, however, the system according to the invention forms two beams which are later combined and the components of the combined beam must be of substantially equal intensity to produce the desired result. Consequently, the beam splitting surface must be oriented to produce substantially equal intensity in the component beams which generally occurs when the plane of reflection at the beam splitting surface is oriented substantially at 45° to the plane of polarization of the incoming beam.

Beam A in FIG. 1 is intercepted and redirected by a planar folding mirror 16 which directs beam A through a polarizing beam combiner 18. Beam B, on the other hand, is intercepted and redirected by a planar folding mirror 20 which directs beam B through a unity power inverting telescope indicated generally at 22 which rotates the wavefront of beam B by 180°. This rotation is equivalent to inversion of the wavefront about the optical axis. After exiting from the telescope 22, beam B enters the polarizing beam combiner 18 and is redirected in a direction parallel to beam A. The compensator causes beam A and beam B to be inverted images of each other, i.e., the wavefront of beam A relative to beam B as it exits face 24 of the polarizing beam combiner 18 is rotated by 180° about two orthogonal axes. By analyzing the optics of FIG. 1, it is clear that this rotation about the optical axis is produced by the unity power inverting telescope 22 of FIG. 1.

The operation of the passive optical network of FIG. 1 is relatively simple. Should a translational or angular misalignment error be introduced by the laser source, the passive compensating system of FIG. 1 is operative to produce a composite beam 26 which comprises the superimposition of beam A and beam B. A translational or angular misalignment in the laser source causes beam A to shift in one direction relative to the center line 11 while causing beam B to shift a corresponding distance in the opposite direction with respect to the center line 11. In its simplest form, beam A and beam B can be thought of producing a circular light spot on a surface on which the composite beam 26 is projected. When perfect alignment is present between the laser and the compensator of FIG. 1, the image appearing on the screen is a single circular substantially uniformly illuminated spot. When translational or angular misalignment occurs, one beam is shifted a given distance with respect to the center line 11 and the other beam is shifted a corresponding distance in the opposite direction. For small misalignments, the two circular spots, however, do overlap and the centroid of the overlapping spots is at the same position that the center of beams A and B occupy when the incoming beam 10 is perfectly aligned with the compensator in FIG. 1.

Figure 2:
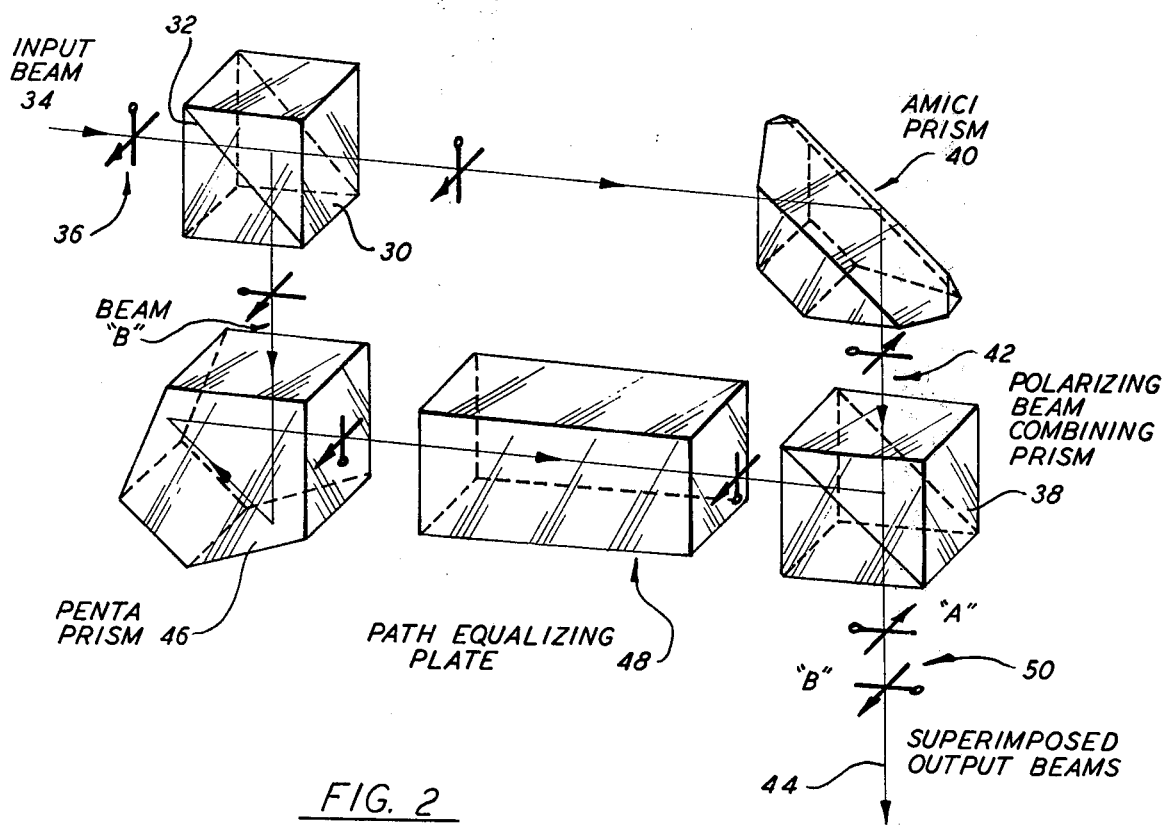
FIG. 2 shows a second embodiment of a passive compensator according to the present invention wherein the compensator utilizes an Amici and a penta prism.

Referring now to FIG. 2, a second embodiment for a passive compensator according to the present invention is shown which also includes a polarizing beam splitting prism 30 disposed with the plane of reflection of its beam splitting surface 32 substantially at a 45° angle to the plane of polarization of the input beam 34. The polarizing beam splitting prism 30 divides the input beam 34 into a transmitted beam (beam A) and a reflected beam (beam B) which are of substantially equal intensity. The wavefront of beam A is not affected by passing through the polarizing beam splitting prism 30, however, the wavefront of beam B is rotated 90° in the counterclockwise direction with respect to the "horizontal" axis which is parallel to the arrow of the "drumstick and arrow" 36.

The compensator according to FIG. 2 has a polarizing beam combining prism 38 which provides further rotation about the "horizontal" axis for beam B but no rotation of beam A.

Disposed between the polarizing beam splitting prism 30 and the polarizing beam combining prism 38 is an optical orientor which is operative to rotate beam A with respect to beam B about two orthogonal axes (the horizontal axis and the vertical axis). The orienting means includes an Amici prism 40 which intercepts beam A. The output from the Amici prism 40 is shown at 42 and indicates that the Amici prism 40 rotates beam A about both the vertical axis as well as the horizontal axis. The output beam 42 then passes directly through the polarizing beam combining prism 38. Beam A as it leaves the polarizing beam combiner 38, forms one component of the composite output beam whose center lies along the center line 44 when the compensator and the light source are in alignment.

Beam B, as it leaves the polarizing beam splitting prism 30 is intercepted by a penta prism 46 which rotates beam B about the horizontal axis. Beam B, as it exits the penta prism 46 is directed toward the polarizing beam combining prism 38 which is disposed with respect to the plane of polarization of beam B so as to provide further rotation of beam B about the horizontal axis. As beam B exits the beam combining prism 38, it is superimposed on beam A to form a composite beam whose center lies along the center line 44 when the input beam source and the compensator are aligned.

The path equalizing plate 48 in the embodiment of FIG. 2 serves to make the optical paths of beams A and B equal. The lateral translations of the beams at the exit face of the beam combining prism 38 due to an angular error of the beam entering the input face of the beam splitting prism 30 are thus also made equal.

Figure 3:
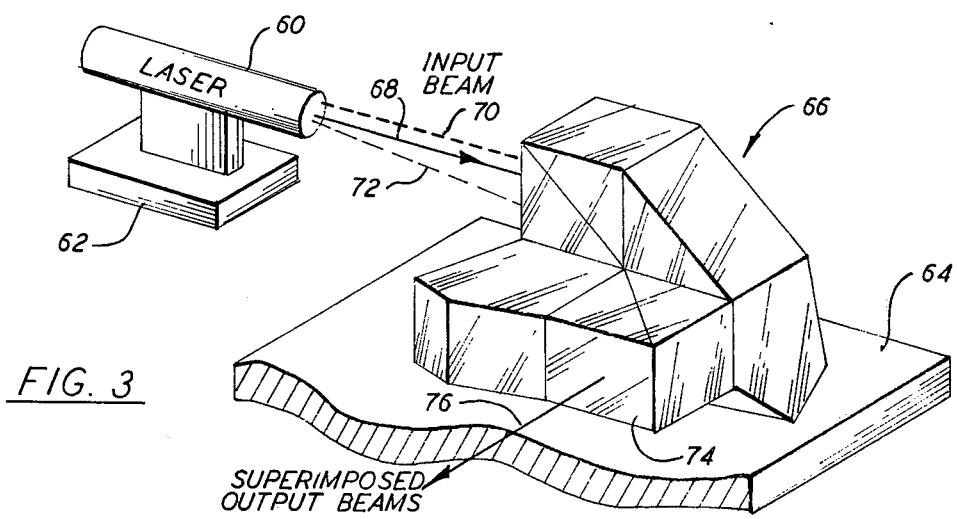
FIG. 3 is a schematic diagram of the alignment system according to the invention wherein the passive compensator includes two penta prisms.

FIG. 3 is a schematic diagram of the preferred embodiment of the invention. A laser beam source 60 is disposed on a body 62 which need not be coupled to the body 64 on which the passive compensator, indicated generally at 66, is mounted. The laser 60 nominally produces a beam having a centroid lying along the solid line 68. However, for typical gas lasers, the centroid of the beam produced thereby is subject to some translational as well as some rotational misalignment. Similar misalignments may result from shifts in the structure connecting bodies 62 and 64. In the case of translational misalignment, the centroid of the beam becomes displaced parallel to the solid line 68 as indicated by the dotted line 70 although this translation is shown in greatly exaggerated form for illustrative purposes only. For rotational misalignment, the centroid of the beam may lie along a dotted line such as 72 which is disposed at an angle to the line 68. When the body 62 and the body 64 are in proper alignment, a composite beam comprising the superimposition of the two beams formed by the compensator 66 exits through face 74 and the centroid of the composite beam lies along the line 76.

The passive compensator 66 of FIG. 3 is shown in its assembled form with its optical elements cemented together to form a solid body which is advantageous because of the structural rigidity of the assembly. The compensator 66 is shown in exploded view of FIG. 4 and like the other compensators described earlier has a polarizing beam splitting cube 68 disposed with the plane of reflection of its beam splitting surface at substantially a 45° angle to the plane of polarization of the input beam 70. By doing so, the polarizing beam splitting cube 68 is operative to split the input beam 70 into two beams, beam A and beam B, of substantially equal intensity. Beam A, the beam transmitted through the polarizing beam splitting cube 68, is intercepted by a 90° prism 72 which redirects the beam and also rotates the wavefront of beam A 90° in the counterclockwise direction about the horizontal axis as viewed in FIG. 4.

Beam A is then directed into a penta prism 74 which is also operative to rotate the wavefront of the beam entering it by 90° about the horizontal axis of the entering beam. Accordingly, when beam A exits penta prism 74, the wavefront of the original beam A exiting the polarizing beam splitting cube 68 has been rotated by 90° about two orthogonal axes. This beam then passes on through the polarizing beam combining cube 76 to form one component of the output beam which comprises the superimposition of beam A and beam B.

Figure 4:
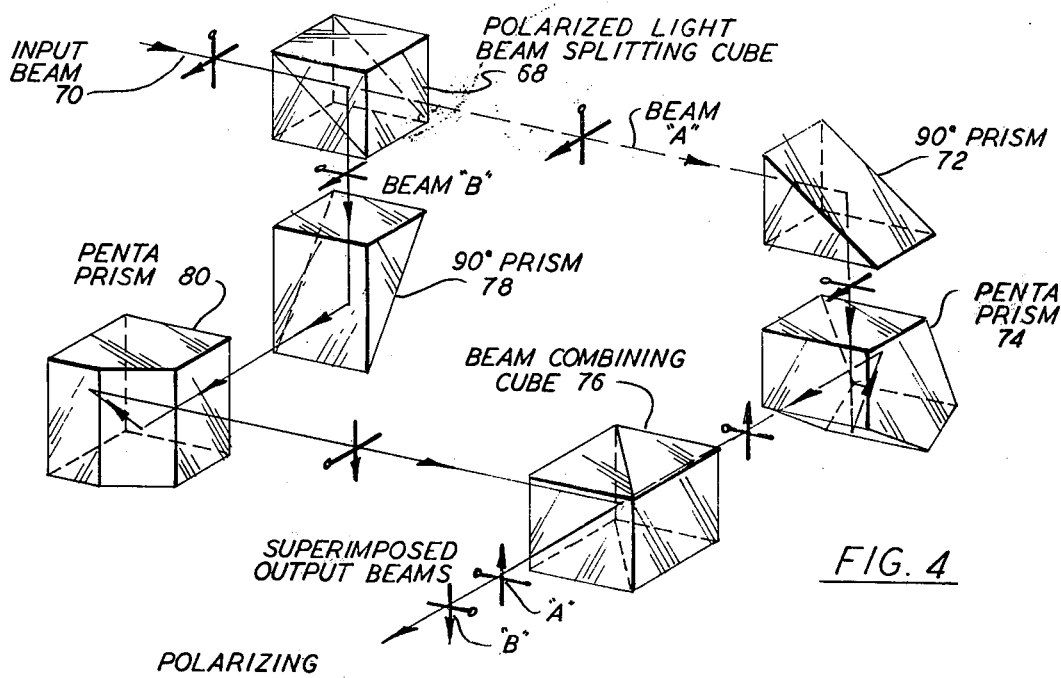
FIG. 4 shows an exploded prespective view of the passive compensator according to FIG. 3.

Beam B is formed by the polarizing beam splitting cube 68 and exits therefrom with its wavefront shifted 90° in a counterclockwise direction about the horizontal axis as viewed in FIG. 4. Beam B then enters a 90° prism 78 which rotates the incoming beam about its horizontal axis. Beam B is then directed into a penta prism 80 which is operative to rotate the wavefront of the entering beam about its vertical axis and then direct beam B toward the beam combining cube 76. The beam combining cube 76 further rotates beam B about its vertical axis and causes it to exit superimposed with beam A thereby forming a composite output beam. As demonstrated by the "drumstick and arrow" representation for the output beams A and B, the wavefront of one beam has been rotated with respect to the other beam by 180° about two orthogonal axes. Accordingly, if either a translational or angular misalignment occurs due to the normal operation of the polarized light source such as a laser, the shift produced in the output beam from the beam combining cube 76 is in equal and opposite direction for beam A than for beam B. Therefore, the centroid or "bright spot" for the output beam will remain at the same position.

The advantages of the compensator as shown in FIGS. 3 and 4 include the fact that the elements can be cemented together to form an integral assembly. Additionally, the compensator utilizes commonly available prism elements none of which are as costly as precision roof prisms. In addition, the configuration is inherently correctly designed for utilizing polarizing beam splitters with high efficiency without the need of phase plates to rotate the plane of polarization. Because the optical paths of beams A and B are inherently equal in the symmetrical configuration of the present invention represented by FIG. 3, no additional component (such as 48 in FIG. 2) is needed to equalize those paths.

Figure 5:
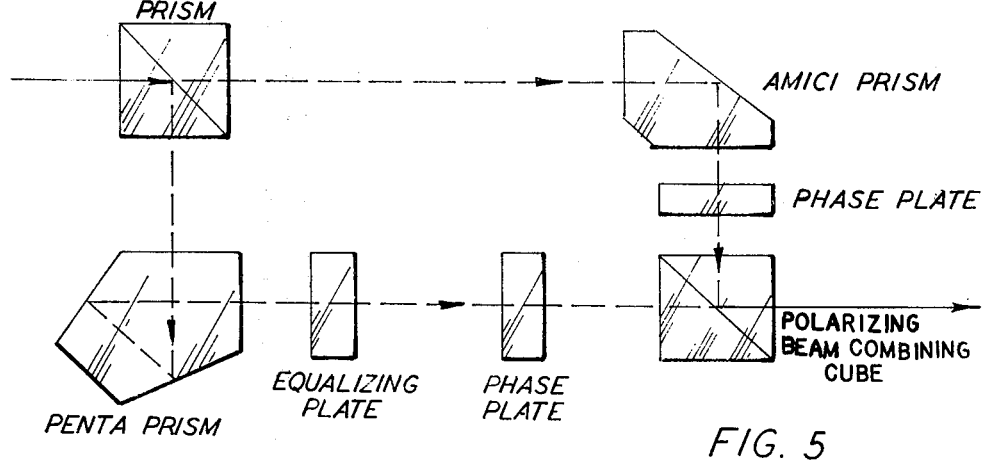
FIG. 5 shows a further alternative embodiment including means to further shift the two beams internal to the compensator so that the composite beam will exit the compensator in a direction substantially parallel to the input beam.

The foregoing description has shown several embodiments of the present invention and in each such embodiment, the incoming beam is converted into an output beam disposed substantially at a 90° angle to the input beam. However, should it be desired to have the output beam travel in a direction substantially parallel to the input beam, one or more phase plates may be introduced into the compensator to rotate the wavefronts of the two separate beams within the compensator so as to produce this desired result. One arrangement for accomplishing this objective is shown in FIG. 5 which is a modification for the compensator shown in FIG. 2. Insertion of a phase plate in a corresponding position in the other embodiments of the invention will achieve the same result.

The foregoing and other modifications to the present invention will be readily understood by those of skill in the art to which the invention pertains and can be made without departing from the spirit and scope of the invention as defined more particularly in the following claims.

What is claimed is:

1. A passive compensator for compensating for angular and translational misalignment of a polarized beam comprising, in combination:
    a polarizing beam splitter for splitting the beam into two components of substantially equal intensity;
    optical orienting means disposed in the path of at least one said component to rotate the wavefront of at least one said component relative to the other said component about two orthogonal axes; and
    a polarizing beam combiner for combining said components so that the net rotation of the wavefront of the components with respect to each other by said splitter, said orienting means and said combiner is substantially 180° about each of said two orthogonal axes.

2. The compensator of claim 1 wherein said orienting means includes path equalizing means disposed along at least one said component path to make each of the paths followed by said components equal.

3. The compensator of claim 1 wherein said orientation means comprises a unity power image inverting telescope.

4. The compensator of claim 1 wherein said orientation means includes an Amici prism in one path of one component and a penta prism in the other component path.

5. The compensator of claim 1 wherein said orientation means includes a penta prism in each component path.

6. The compensator of claim 1 additionally including a phase plate in the path of each said component so that the composite beam exits said combiner in a direction substantially parallel to the beam entering said splitter.

7. The compensator of claim 1 wherein said splitter, said orienting means and said combiner are cemented together to form a solid mass.

8. A system for compensating for alignment errors introduced into the system by its polarized light source comprising, in combination:
- a polarized light source subject to translational and rotational error in its output beam;
- a polarizing beam splitter disposed to intercept said output beam and to divide said output beam into a transmitted component and a reflected component of substantially equal intensity;
- optical orienting means disposed to intercept at least one of said transmitted component or said reflected component to rotate the wavefront of the intercepted component about two orthogonal axes;
- a polarizing beam combiner disposed to intercept both said components to form a composite beam of both said components where the net rotation of the wavefront of one component with respect to the other component about said two orthogonal axes is 180° so the centroid of said composite beam remains at one location even when said output beam is subject to rotation and translation due to its normal operation.

9. The system for compensating for alignment errors of claim 8 additionally including path equalizing means disposed to intercept at least one of either said transmitted component or said reflected component.

10. The system for compensating for alignment errors of claim 8 additionally including a phase plate disposed to intercept said transmitted component and a phase plate disposed to intercept said reflected component prior to entering said combiner, said phase plates providing rotation of the wavefronts of both said transmitted component and said reflected component whereby said composite beam will emerge from said recombiner in a different orientation than for the system without said phase plates.

11. The system of claim 8 wherein said orientation means comprises a unity power image inverting telescope.

12. The system of claim 8 wherein said orientation means includes an Amici prism intercepting one said component and a penta prism intercepting the other said component.

13. The system of claim 8 wherein said orientation means includes a penta prism disposed to intercept each said component.

14. A system permitting determination of precise alignment of one body relative to another comprising, in combination:
- a source of polarized light subject to translational and rotational error in its output beam;
- a polarizing beam splitter disposed to intercept said output beam and split it into a transmitted component and a reflected component;
- a first 90° prism and a first penta prism disposed to intercept said reflected component; and
- a polarizing beam combiner disposed to intercept said transmitted component after exiting said first penta prism and to intercept said reflected component after exiting said second penta prism, said splitter, said first 90° prism, said second 90° prism, said first penta prism, said second penta prism and said combiner being disposed so that the combined beam exiting said combiner has the wavefront of one of its two components rotated by 180° about two orthogonal axes with respect to the other component so the centroid of said combined beam remains in a fixed location despite translational and rotational displacement of said output beam from said source.

15. The system of claim 14 wherein said polarizing beam splitter is positioned with respect to said output beam so that said transmitted component and said reflected component are of substantially equal intensity.

* * * * *